United States Patent [19]

Kelley

[11] 3,737,880

[45] June 5, 1973

[54] FLEXIBLE DISC WITH AIR INTAKE IN TURNTABLE

[75] Inventor: Jerry O. Kelley, Grass Valley, Calif.

[73] Assignee: Arvin Industries, Inc., Grass Valley, Calif.

[22] Filed: Sept. 10, 1971

[21] Appl. No.: 179,465

[52] U.S. Cl. .......340/174.1 E, 179/100.2 A, 346/137

[51] Int. Cl. ..........................G11b 5/60, G11b 25/04

[58] Field of Search ...............................340/174.1 E; 174/100.2 A, 100.2 P; 346/137

[56] References Cited

UNITED STATES PATENTS

| | | | |
|---|---|---|---|
| 2,937,240 | 5/1960 | Harker | 340/174.1 E |
| 3,537,083 | 10/1970 | Voth | 340/174.1 E |
| 3,336,583 | 8/1967 | Comstock | 179/100.2 P |
| 3,488,646 | 1/1970 | Sugayz et al. | 179/100.2 A |
| 3,373,413 | 3/1968 | Treseder | 179/100.2 P |

*Primary Examiner*—Vincent P. Canney

*Attorney*—Lawrence B. Biebel et al., William D. Zahrt, III and John W. Donahue

[57] ABSTRACT

A magnetic disc recorder includes a removably mounted lightweight disc having a shallow air chamber over which is fastened a flexible membrane of recording media. The disc is removably held on a turntable and aligned air passages lead to the interior of the chamber from an external scoop which forces air into the chamber upon rotation. Such pressurization expands the membrane to contact a transducer.

3 Claims, 4 Drawing Figures

INVENTOR

JERRY O. KELLEY

BY

Marechal, Biebel, French & Bugg

ATTORNEYS

FLEXIBLE DISC WITH AIR INTAKE IN TURNTABLE

BACKGROUND OF THE INVENTION

The invention relates to disc type magnetic recording mechanism, particularly disc type recorders used in connection with the recording and playback of video and similar signals. There are a number of disc type records commercially available, however these use a solid rigid magnetic disc member having a highly finished surface. In order to achieve the maximum bandwidth in recording and replay, the magnetic transducer or head should run as close to the disc surface as possible, but actual contact must be avoided to protect the disc surface (and the head) from damage. Obviously as the disc to head space is decreased, to improve the bandwidth of the recorded material, the likelihood of severe damage or excessive wear increases.

Various suggestions have been made for the use of a resiliently mounted magnetic surface which can be moved against the head or transducer, but still have sufficient resilience, and be sufficiently inexpensive, to minimize this problem. A resilient magnetic drum surface which is expanded by air pressure to contact one or more heads is disclosed in U.S. Pat. No. 3,036,304. Similar arrangements where the magnetizable surface is on a flexible membrane across one end of a cylinder, in the nature of a drum head, are disclosed in U.S. Pat. No. 3,336,583. Recent patents disclosing a flexible annular membrane mounted on a rotatable disc carrier are U.S. Pat. Nos. 3,488,646, 3,509,274 and 3,537,083.

In U.S. Pat. No. 3,488,646 an aperture is located in the rigid disc carrier such that the air pressure within the chamber to bulge the flexible magnetizable sheet outward is controlled to provide a lesser pressure at the center of the air space and a progressively increasing pressure toward the periphery of the rotating disc assembly, in order to achieve so-called maximum flat pressure on the magnetizable sheet for contact with the transducer. In U.S. Pat. No. 3,537,083, the air pressure within the chamber on the rotating disc is controlled to bulge the flexible magnetizable membrane or recording film outward against one or more magnetic transducers, the disc member is mounted on a hub and held in place by suction, and the air under pressure needed to bulge the magnetizable membrane of the disc is supplied from some controlled source, either a passage through a supporting hub, or through an annular shroud surrounding the periphery of the disc assembly. This air supply source is then controlled by a suitable valving arrangement to turn the air pressure on and off.

These prior art patents recognize the desirability of providing a compliant magnetizable surface which will run in contact with the magnetic transducer, thus achieving the best possible recording and reproduction results, and at the same time allowing for certain inaccuracies in the manufacture, handling and operation of the disc or similar magnetizable member, which may cause variation in runout and consequent variation in the pressure between the transducer and the magnetizable surface, were this compliant pressure not available. Such an arrangement also permits a simpler and more accurate mounting of the transducer, since its mounting does not need to be compliant, as in the sense of the vertically movable tone arm on a conventional phonograph record player.

SUMMARY OF THE INVENTION

The present invention provides a simplified, lower cost, magnetic disc type recorder in which the need for a separately controlled pressure air source is eliminated, and in which the desired pressurizing of a magnetizable flexible membrane into compliance with a magnetic transducer is achieved in a simple and inexpensive manner. In accordance with the invention a rotating turntable is provided, which turntable can be a relatively heavy and rigid member also functioning as a form of flywheel to minimize rotational speed variations. On this turntable there is a fitting arranged to receive a separate, lightweight, inexpensive magnetic disc record member which comprises a rigid carrier disc that may be formed of a rigid and relatively inexpensive lightweight material such as a plastic or a light metal, and which is readily removable from the turntable.

This disc has a raised lip or peripheral portion and a raised central portion which may be conveniently be referred to as the hub of the disc. Between these portions the surface of the disc is depressed thus defining a shallow air chamber. Across this chamber there is fastened a thin flexible membrane which has the usual magnetizable surface coating. The membrane base may be conveniently formed of Mylar film having a thickness in the order of 1 mil or less, essentially like a high quality standard magnetic recording tape.

This membrane is secured to the disc, extending over the entire air chamber, by a suitable adhesive or in some other suitable fashion such that it completely covers and encloses the air chamber. Extending through the disc body there are one or more air passages. Preferably, these passages extend vertically through the disc body about midway between the center and the periphery of the disc, and these passages are adapted to align with corresponding passages in the turntable. These air passages provide the sole communication between the air chamber in the disc and the surrounding atmosphere. At the outer end of the air passages on the turntable there are scoop-like members having an open face directed forward in the direction of rotation of the turntable, and arranged thus to force air into the passages, and into the air chamber, due solely to the rotation of the turntable when the mechanism is operating. It has been found that the rotation desired for suitable recording of video signals and the like is more than adequate to provide the air pressure needed to bulge the flexible recording membrane upward of the disc air chamber into compliant contact with the magnetic transducer. Such an arrangement is relatively immune to vibration or perturbation in the recording mechanism itself, or in its environment, and is not adversely effected by slight inaccuracies in the flatness and trueness of the disc, turntable and related parts.

Accordingly, the primary object of this invention is to provide a novel magnetic disc type recording mechanism in which the recording media is a thin flexible membrane supported at its edges across a shallow air chamber in a carrier disc, removably mounted on a rotatable turntable, and having provisions in the form of one or more air passages which lead to the exterior of the disc and are constructed and arranged to force air into the air chamber in response to rotation of the disc and turntable, whereby rotation of the turntable automatically causes the membrane to bulge slightly outwardly of the air chamber, due solely to the rotational movement of the disc, and this action automatically causes the membrane which has a magnetizable surface to come into compliant operating relation with one or more magnetic transducers, thereby to record and/or replay information from the surface; to provide such an arrangement wherein the disc and associated flexible membrane with its magnetizable surface is a lightweight, relatively inexpensive member that can readily be placed upon and removed from the turntable, and is easily capable of storage, transportation, and the like at relatively low cost.

Other objects and advantages of this invention will be apparent from the following description, the accompanying drawings and the appended claims.

DESCRIPTION OF THE PREFERRED EMBODIMENT

Figures 1, 2, 3, 4:
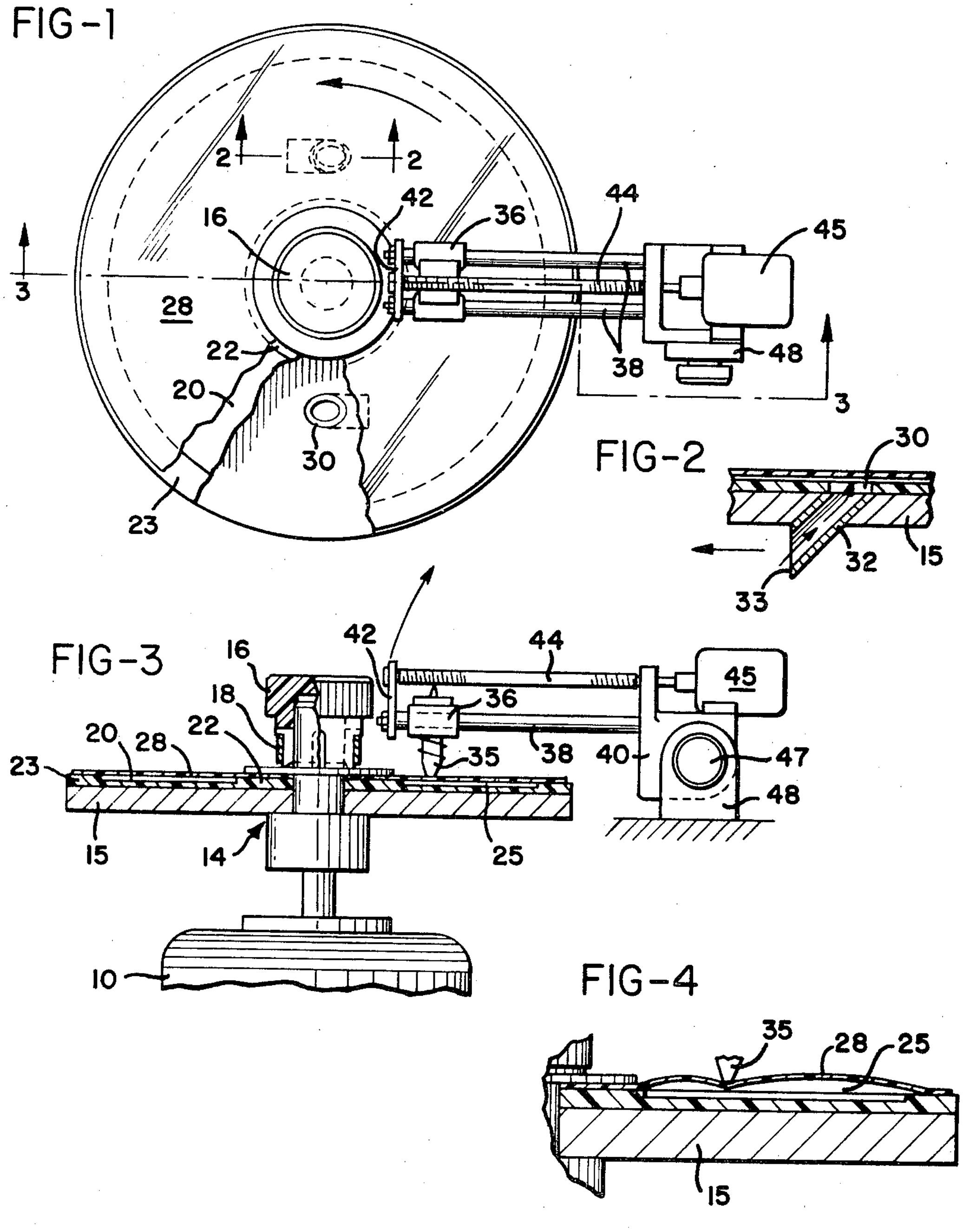
FIG. 1 is a view of magnetic disc type recording mechanism constructed in accordance with the invention, showing a portion of the magnetizable membrane, and a portion of the carrier disc for the membrane, broken away to expose a surface portion of the turntable and one of the air passages therein.
FIG. 2 is an enlarged partial sectional view, taken on line 2—2 in FIG. 1, showing details of the air passage arrangement through the turntable and the carrier disc.
FIG. 3 is a side view, with the turntable and carrier disc shown in section, illustrating the apparatus shown in FIG. 1 as viewed generally along the line 3—3 of FIG. 1.
FIG. 4 is an enlarged detail section showing in an exaggerated manner the way in which the membrane bulges into compliant contact with the magnetic transducer during operation of the mechanism.

Referring first to FIG. 3, a drive motor 10 having an output shaft 12 rotates hub structure 14 to which is attached a relatively heavy and rigid turntable 15. In an actual embodiment of the invention, by way of reference and example, the turntable may have a diameter in the order of 12 to 15 inches. The motor may be a synchronous motor, or a variable speed servo controlled motor. The hub structure includes a retaining hold-down cap 16 which holds the carrier disc on the upper surface of the turntable 15 by gripping the extending end of hub 14 to provide for quick removal and replacement of the disc. The cup may have a split end surrounded by a spring 18 to press the cup against the hub end.

The disc 20 is constructed of plastic or lightweight metal, and is relatively thin and inexpensive in construction. It includes a thicker hub section 22 having a central opening which fits around the hub structure 14, and an outer peripheral portion or lip 23 which is raised to the same elevation as the hub structure 22, defining therebetween a relatively shallow annular air chamber 25. This air chamber is more apparent in FIGS. 2 and 4.

Stretched across the air chamber and fastened to the hub portion 22 and the peripheral lip portion 23 is a thin flexible membrane 28 having a magnetizable upper surface. This material is essentially the same as ordinary magnetic recording tape of good commercial quality, and may comprise a base of Mylar or the like of a thickness in the order of 1 mil, or even less, having a magnetizable surface or coating.

Approximately in the center of the air chamber 25 there are one or more air passages or holes 30 extending through the disc 20 providing the sole communication between the air chamber 25 and the exterior of the disc carrier. In the preferred embodiment this passage 30 aligns with a further air passage in the turntable, formed by a tubular insert 32 which extends through the turntable and opens at the lower exterior of the turntable in an angular face 33 which functions as an air scoop, being directed forward with respect to the normal rotation of the turntable. Thus, as the turntable rotates, air automatically is forced through the tube 32 and the passage 30 into the air space 25, causing the membrane 28 to bulge upwardly as illustrated in a somewhat exaggerated manner in FIG. 4.

Extending over the surface of the disc carrier is the mounting for one or more magnetic transducers 35, sometimes referred to as a magnetic head. The transducer is supported on a slide 36 which in turn is carried upon a pair of support rods 38 that extend from a mounting bracket 40 positioned outwardly of the periphery of the carrier disc and turntable. The inner ends of the rods 38 are joined by an end plate 42, which also provides an end bearing support for a lead screw 44 that extends from the plate 42 to the mounting bracket 40, and may be rotated selectively by a motor 45. This motor preferably is in the nature of a stepping motor capable of rotating its shaft in discrete increments, thereby to locate the transducer 35 in specific different locations radially of the membrane 28. It is also possible to use a continuously rotating motor synchronized with the turntable speed to produce a continuous helical track over the membrane 28.

The entire mounting structure for the transducer, including the bracket 40, constitutes an arm arrangement which is pivotally mounted on a crosspin or shaft 47 carried in the base mounting member 48. Thus, the entire arm assembly can be swung upward and away from the turntable, in order to permit quick changing of the carrier discs.

With reference to FIG. 4, it will be noted that the pressurizing of the air chamber 25 causes the membrant 28 to bulge outward somewhat, and thus to move into compliant contact with the transducer 35. It should be understood that although the term "contact" is used, it may be that under circumstances where the turntable and carrier disc are rotating at a substantial speed, there is in fact a thin film of air between the transducer and the magnetizable surface of the membrane. However, for purposes of explanation of the present invention, this arrangement is considered operative contact between the magnetizable surface and the transducer 35.

The simplicity of the arrangement is readily apparent from the drawings. Mere rotation of the carrier disc causes pressurizing of the air chamber and the desired movement of the membrane into compliant contact with the transducer. There is no need to provide controls of any kind for this purpose, nor is there any requirement for a separate source of pressurized air. When rotation of the turntable ceases, the air pressure automatically reduces in the air chamber, and the membrane will recede from the transducer. Various arrangements can be provided to permit quick changing of carrier discs on the turntable, and these may involve other holding arrangements which are more sophisticated than the simple cap arrangement illustrated in FIG. 3. For example, a magnetic holding arrangement might be provided, using one or more permanent magnets, and a corresponding magnetizable or ferrous armature piece in the carrier disc, provided that suitable barrier arrangements are incorporated to prevent undesired interaction between the permanent magnet field and the magnetized regions of the membrane surface. It is also possible to provide the desired clamping action by suction, as well as by other mechanical means.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A magnetic disc-type recording mechanism comprising a rotatable turntable, a rigid carrier disc having a hub and a shallow air chamber over a substantial part of its surface, a thin flexible membrane fastened to said disc covering said chamber and having a magnetizable outer surface, means for locating said disc on said turntable including a removable cap operating to hold said disc on said turntable for quick removal, an air passage through said disc providing the sole communication into said chamber, an air scoop facing in the direction of rotation of said turntable and arranged to force air into said passage solely as a result of rotation of the turntable for moving said membrane outward of said chamber, and a magnetic transducer mounted to cooperate effectively with variable flux fields created in the magnetizable surface of said membrane only upon outward movement thereof.

2. A recording mechanism as defined in claim 1 including stepping means connected to said transducer and operating to locate said transducer opposite different locations transversely of said membrane.

3. In a magnetic disc-type recording mechanism including a turntable, means for rotating said turntable at a predetermined speed, a rigid carrier disc having a shallow air chamber on its surface, a magnetic recording media in the form of a thin flexible membrane fastened to said disc extending across said chamber, means for holding said disc on said turntable, an air passage through said disc providing the sole communication between said chamber and the surroundings of said mechanism, and a transducer mounted in spaced relation to said membrane; the improvement comprising an air scoop on said turntable having an entrance facing forward with respect to the direction of rotation of said turntable, said scoop being connected to force air into said passage during rotation of the turntable for moving said membrane outward of said chamber.

* * * * *